United States Patent
Davis (10) Patent No.: US 11,034,397 B1
(45) Date of Patent: Jun. 15, 2021

(54) ROLLING SPARE TIRE STORAGE APPARATUS

(71) Applicant: Nolan Davis, Richmond, TX (US)

(72) Inventor: Nolan Davis, Richmond, TX (US)

( * ) Notice: Subject to any disclaimer, the term of this patent is extended or adjusted under 35 U.S.C. 154(b) by 17 days.

(21) Appl. No.: 16/735,058

(22) Filed: Jan. 6, 2020

(51) Int. Cl.
B62D 43/04 (2006.01)

(52) U.S. Cl.
CPC .................. *B62D 43/045* (2013.01)

(58) Field of Classification Search
CPC ...... B62D 43/02; B62D 43/04; B62D 43/002; B62D 43/045; B60R 11/06; B60R 9/048; Y10T 70/5987; Y10T 70/5991
USPC ........... 224/42.12, 42.21, 42.23, 42.26, 42.3; 211/23–24
See application file for complete search history.

(56) References Cited

U.S. PATENT DOCUMENTS

| | | | |
|---|---|---|---|
| 377,470 A | 2/1888 | Shepard | |
| 3,435,971 A | 4/1969 | Powell | |
| 3,554,415 A | 1/1971 | Woods | |
| 3,724,731 A * | 4/1973 | Potgieter | B62D 43/002 224/42.23 |
| 4,312,620 A | 1/1982 | Muschalek | |
| 4,418,852 A * | 12/1983 | Grinwald | B62D 43/04 224/310 |
| 4,913,265 A * | 4/1990 | Richards | B60R 25/093 188/32 |
| 5,678,796 A * | 10/1997 | James | B60J 11/00 135/88.1 |
| 5,860,786 A * | 1/1999 | Aubrecht | B62D 43/045 414/463 |
| 5,993,133 A * | 11/1999 | Murray | B62D 43/045 224/42.12 |
| 6,053,690 A * | 4/2000 | Hanson | B62D 43/04 224/42.21 |
| 7,954,679 B2 | 6/2011 | Edwards | |
| 2015/0284040 A1 | 10/2015 | Dombrowsky | |

* cited by examiner

Primary Examiner — Adam J Waggenspack (57) ABSTRACT

A rolling spare tire storage apparatus for easy access to spare tires includes a tire rack. A plurality of rollers and a plurality of arms are coupled to the tire rack. A plurality of brackets is coupled to the plurality of arms and is configured to selectively engage a tire and secure the tire to the rack body. A pivot mount comprises a pivot bar. A pair of back arms is coupled to the pivot bar. A pair of roller tracks is coupled to the pair of back arms. A pair of hydraulic cylinders is coupled to the pair of roller tracks. Each cylinder has a lock maintaining a compressed position securing the pair of roller tracks horizontally and alternatively releasing each cylinder to an extended position and angling the pair of roller tracks. A release button is in operational communication with the lock of each cylinder.

8 Claims, 7 Drawing Sheets

ROLLING SPARE TIRE STORAGE APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to spare tire storage devices and more particularly pertains to a new spare tire storage device for easy access to spare tires.

(2) DESCRIPTION OF RELATED ART INCLUDING INFORMATION DISCLOSED UNDER 37 CFR 1.97 AND 1.98

The prior art relates to spare tire storage devices.

BRIEF SUMMARY OF THE INVENTION

An embodiment of the disclosure meets the needs presented above by generally comprising a tire rack comprising a rack body having a rack top side, a rack bottom side, and a rack perimeter. A plurality of rollers is coupled to a left edge and a right edge of the rack perimeter. A plurality of arms is coupled to the rack top side and is selectively rotatable. A plurality of brackets is coupled to the plurality of arms. The brackets are configured to selectively engage a tire and secure the tire to the rack body. A pivot mount comprises a pivot bar being configured to be pivotably coupled to an underside of a truck. A pair of back arms is coupled to the pivot bar and extend vertically down from the pivot bar. A pair of roller tracks is coupled to the pair of back arms. The pair of roller tracks rollingly receive the plurality of rollers. A pair of hydraulic cylinders is coupled to the pair of roller tracks. A cylinder top end of each cylinder is configured to be coupled to the underside of the truck. Each cylinder has a lock maintaining a compressed position securing the pair of roller tracks horizontally and alternatively releasing each cylinder to an extended position and angling the pair of roller tracks. A release button is in operational communication with the lock of each cylinder and is configured to be coupled within a cab of the truck.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
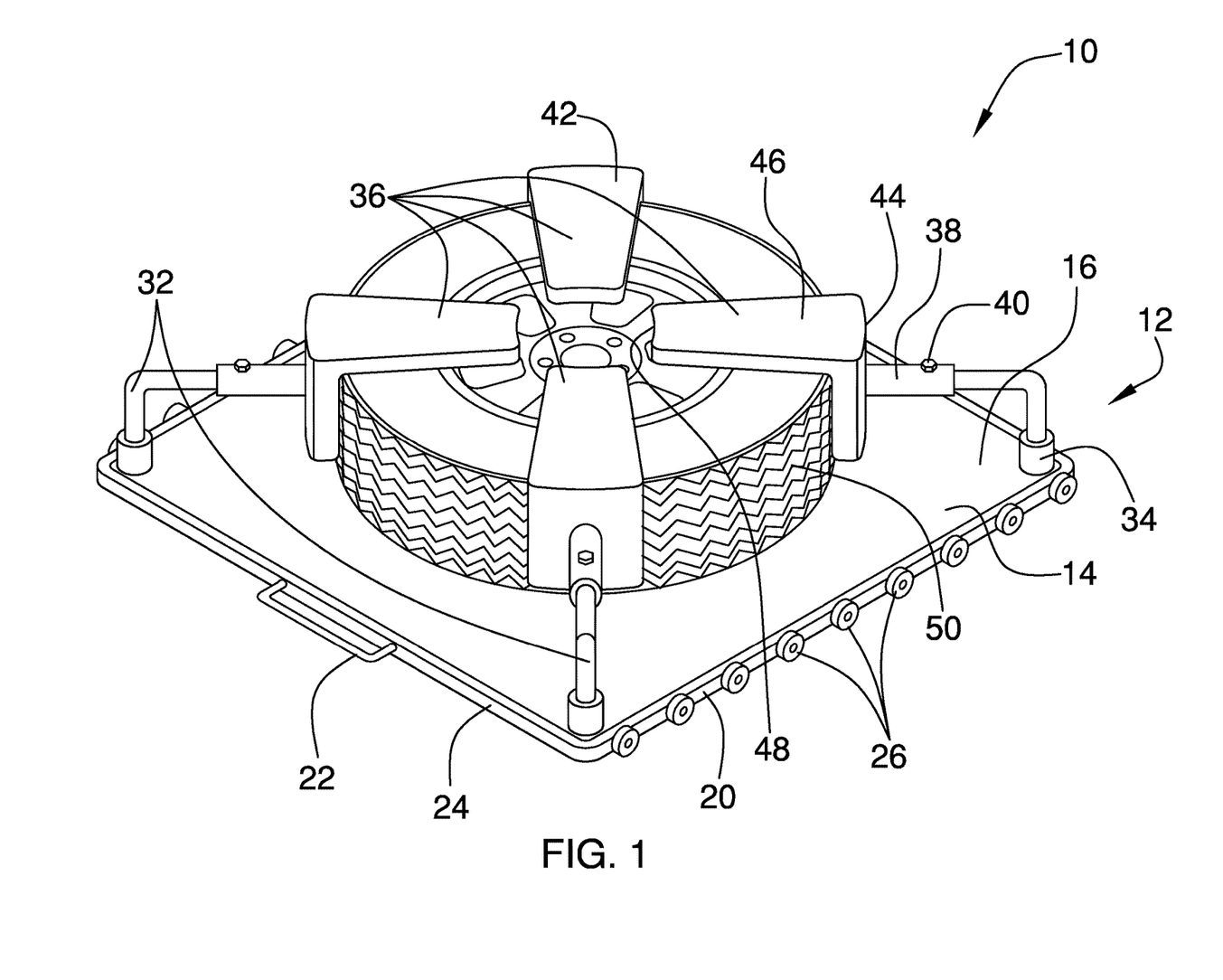
FIG. 1 is an isometric view of a rolling spare tire storage apparatus according to an embodiment of the disclosure.
Figure 2:
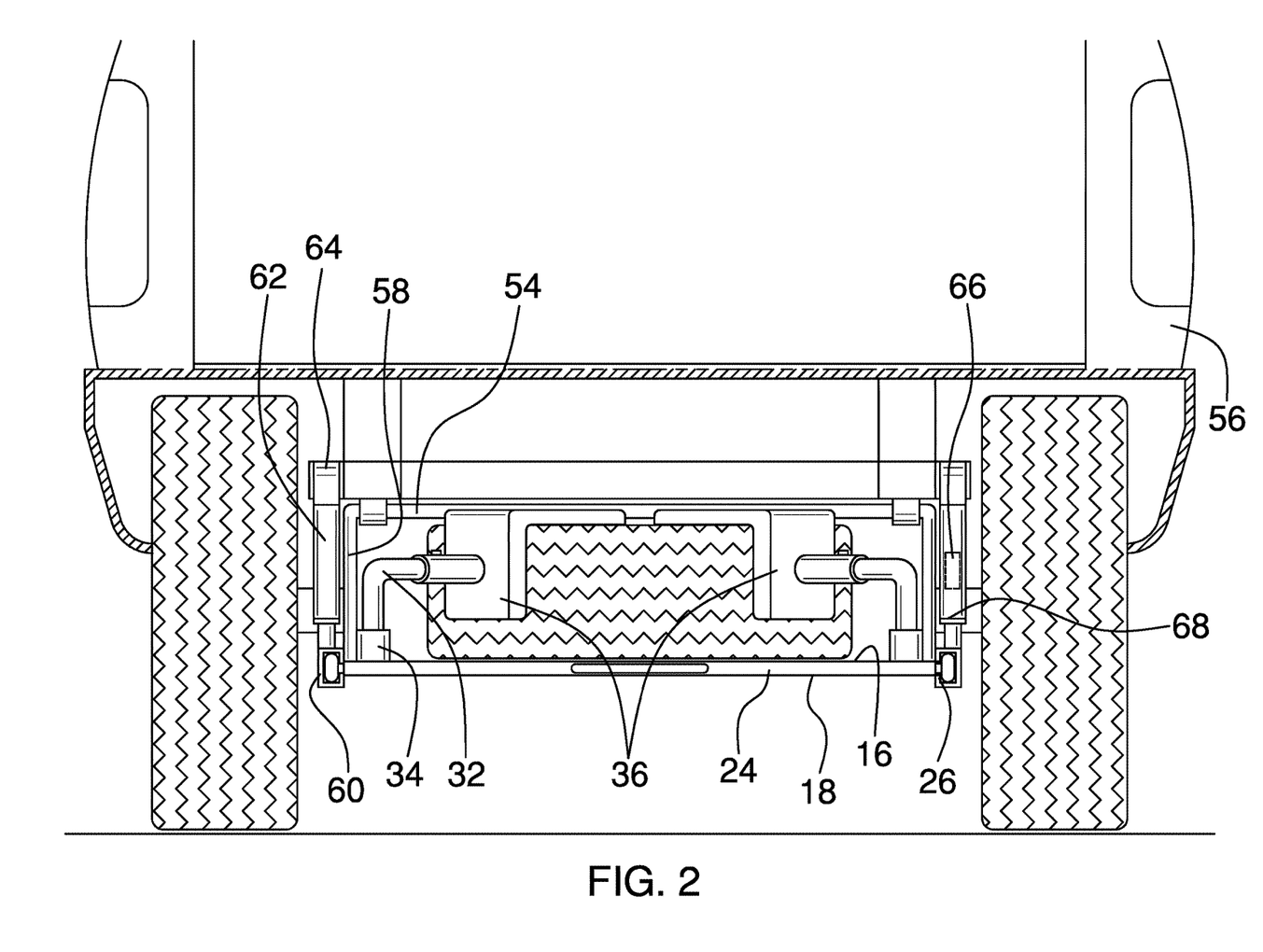
FIG. 2 is a front elevation view of an embodiment of the disclosure.
Figure 3:
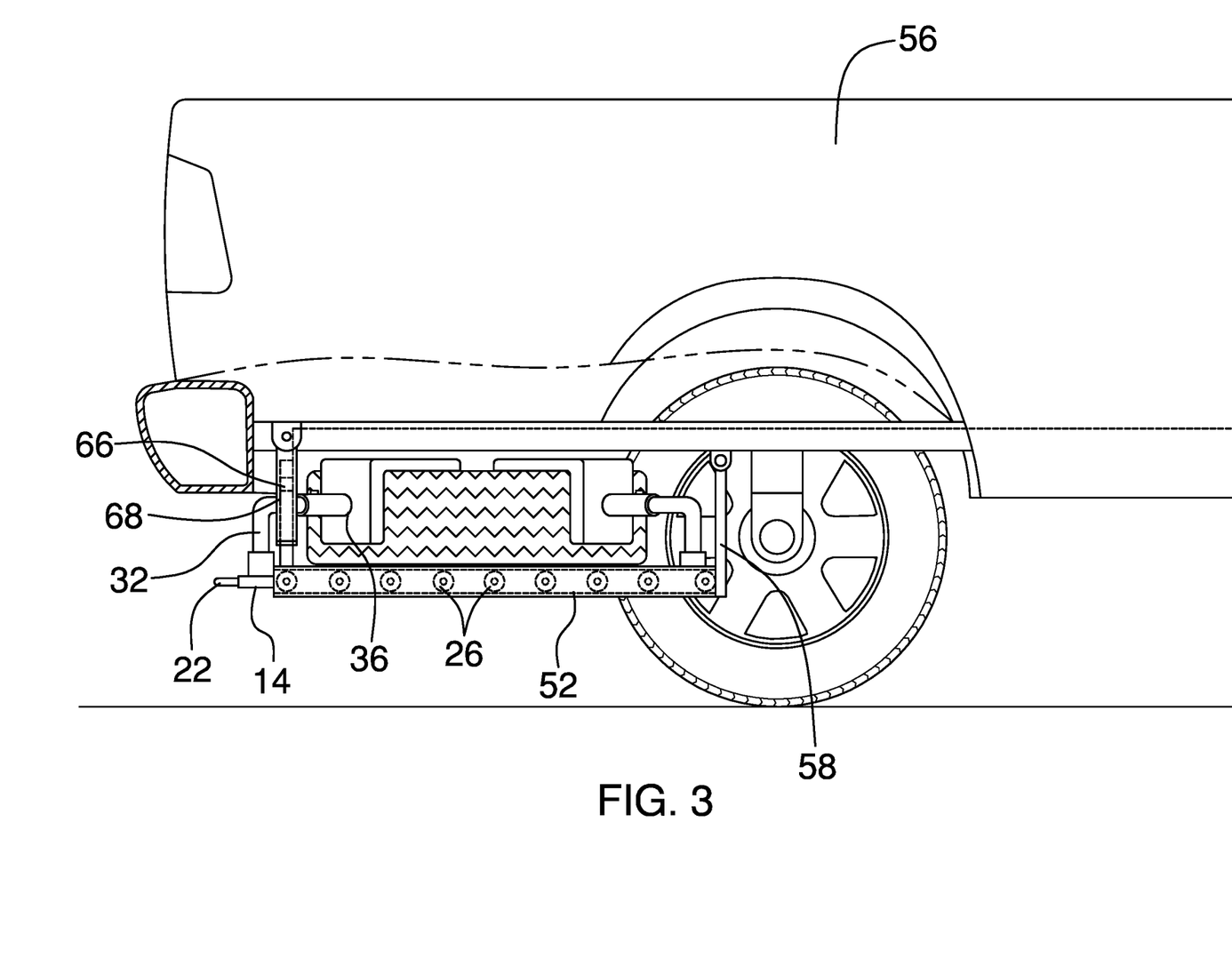
FIG. 3 is a side elevation view of an embodiment of the disclosure.
Figure 4:
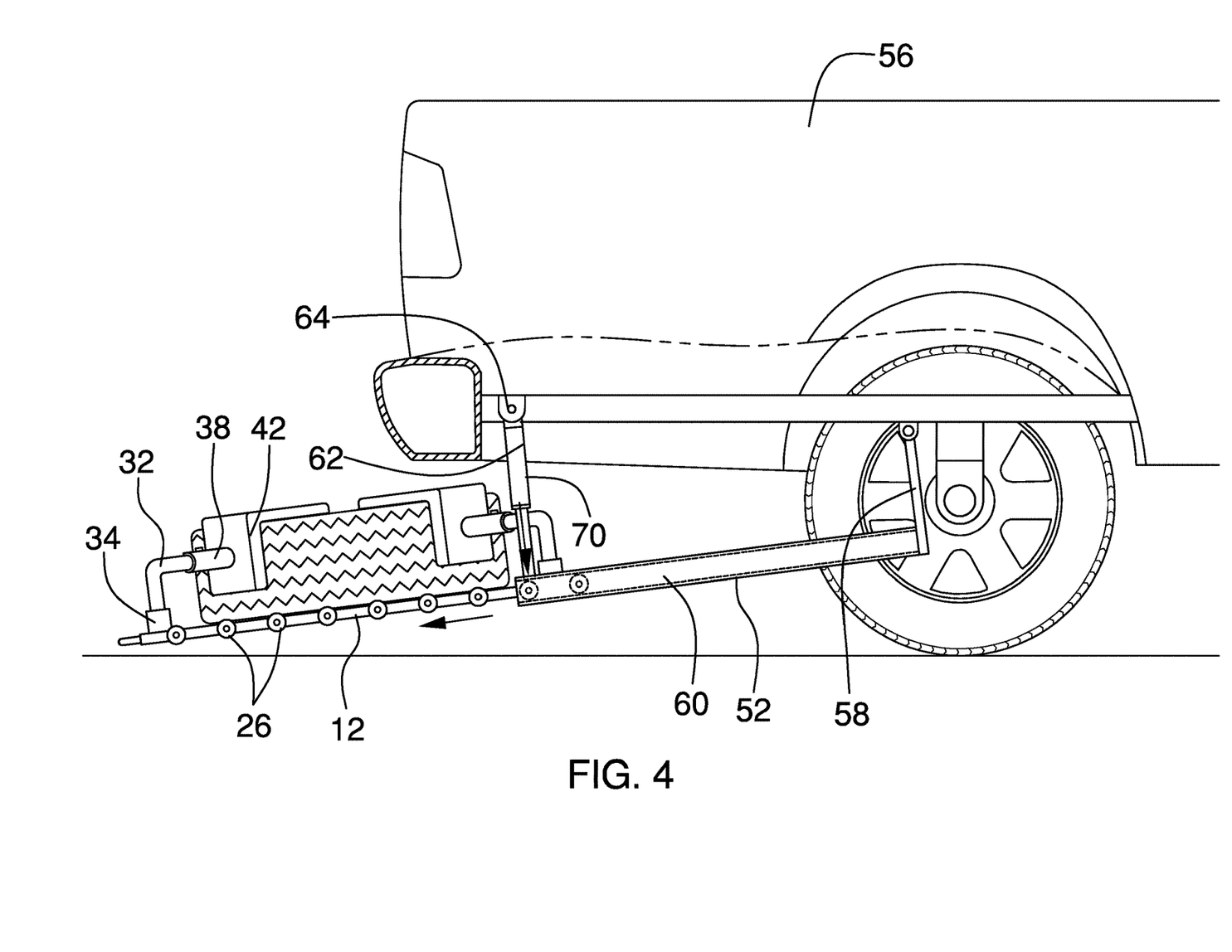
FIG. 4 is an side elevation view of an embodiment of the disclosure.
Figure 5:
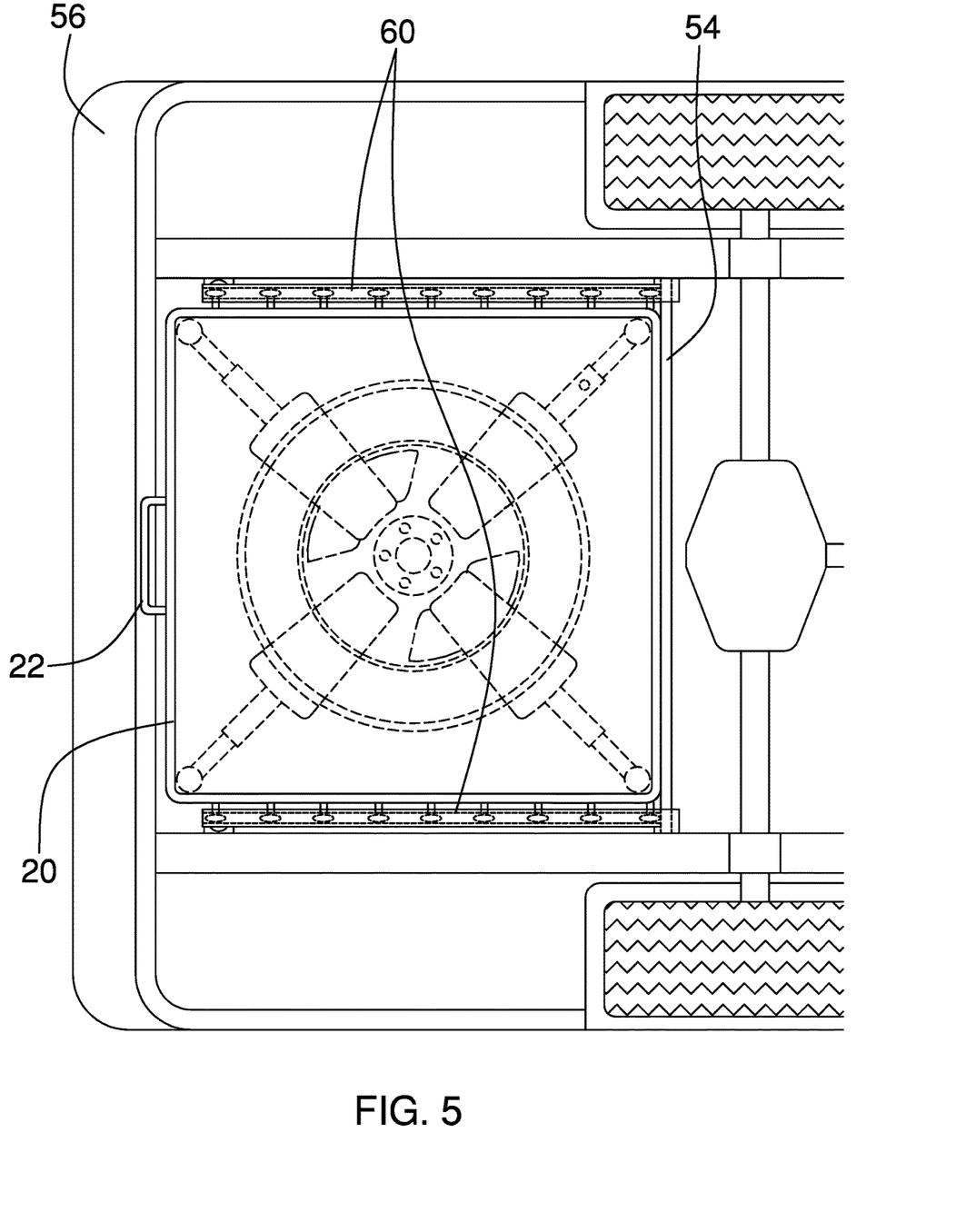
FIG. 5 is a bottom plan view of an embodiment of the disclosure.
Figure 6:
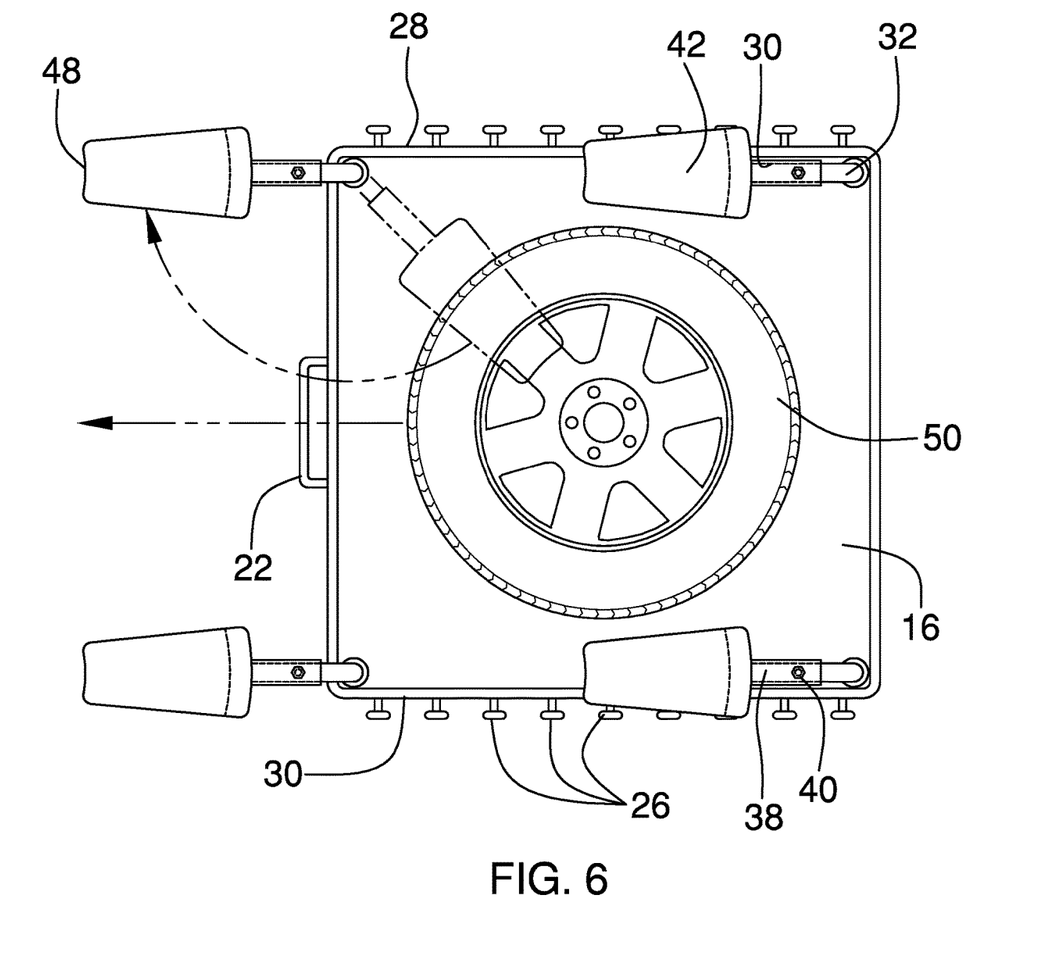
FIG. 6 is a top plan view of an embodiment of the disclosure.
Figure 7:
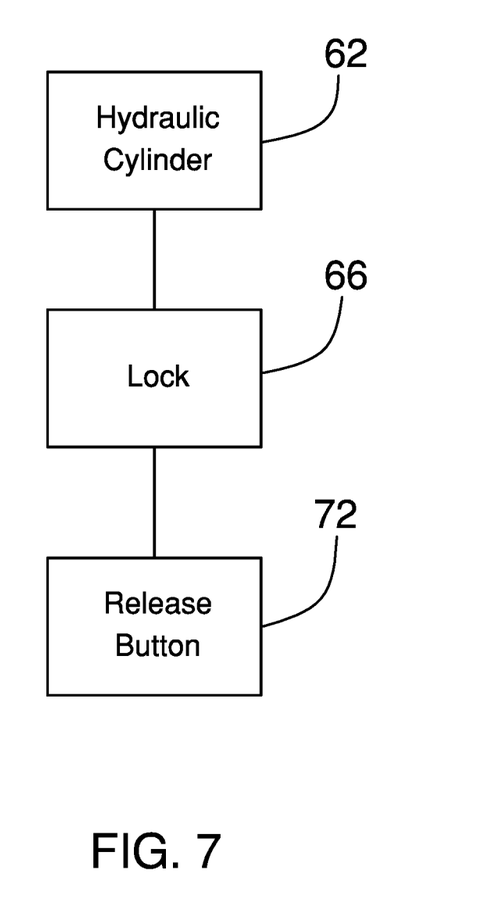
FIG. 7 is a block diagram of an embodiment of the disclosure

With reference now to the drawings, and in particular to FIGS. 1 through 7 thereof, a new spare tire storage device embodying the principles and concepts of an embodiment of the disclosure and generally designated by the reference numeral 10 will be described.

As best illustrated in FIGS. 1 through 7, the rolling spare tire storage apparatus 10 generally comprises a tire rack 12 comprising a rack body 14 having a rack top side 16, a rack bottom side 18, and a rack perimeter 20. A handle 22 is coupled to a lead edge 24 of the rack body 14. A plurality of rollers 26 is coupled to a left edge 28 and a right edge 30 of the rack perimeter 20. A plurality of arms 32 is coupled to the rack body 14. Each arm 32 is L-shaped and has a cylindrical shoulder 34 coupled to the rack top side 16. The arm 32 is selectively rotatable within the shoulder 34. A plurality of brackets 36 is coupled to the plurality of arms 32. Each of the brackets 36 has a sleeve 38 slidably coupled around the arm 32. The sleeve 38 has a locking bolt 40 to adjustably secure the sleeve 38 to the arm 32. A bracket body 42 is coupled to the sleeve 38 and has an L-shaped profile and comprises a side wall 44 and a top wall 46. The top wall 46 tapers towards a rounded inner edge 48. The bracket body 42 is configured to selectively engage a tire 50 and secure the tire 50 to the rack body 14. A pivot mount 52 comprises a pivot bar 54 being configured to be pivotably coupled to an underside of a truck 56. A pair of back arms 58 is coupled to the pivot bar 54 and extends vertically down from the pivot bar 54. A pair of roller tracks 60 is coupled to the pair of back arms 58 and rollingly receives the plurality of rollers 26. A pair of hydraulic cylinders 62 is coupled to the pair of roller tracks 60. A cylinder top end 64 of each cylinder 62 is configured to be coupled to the underside of the truck 56. Each cylinder 62 has a lock 66 maintaining a compressed position 68 securing the pair of roller tracks 60 horizontally and alternatively releasing each cylinder 62 to an extended position 70 and angling the pair of roller tracks 60. A release button 72 is in operational communication with the lock 66 of each cylinder 62. The release button 72 is configured to be coupled within a cab of the truck 56.

In use, the truck 56 is parked and the user depresses the release button 72 to release each cylinder 62 to an extended position 70 to angle the pair of roller tracks 60 allows the plurality of rollers 26 of the rack perimeter 20 to roll down the roller tracks 60 to allow the user to easily reach the tire 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A rolling spare tire storage apparatus comprising:
    a tire rack, the tire rack comprising:
        a rack body, the rack body having a rack top side, a rack bottom side, and a rack perimeter;
        a plurality of rollers coupled to the rack, the plurality of rollers being coupled to a left edge and a right edge of the rack perimeter;
        a plurality of arms coupled to the rack body, each arm being coupled to the rack top side, the arms being selectively rotatable; and
        a plurality of brackets coupled to the plurality of arms, the brackets being configured to selectively engage a tire and secure the tire to the rack body; and
    a pivot mount, the pivot mount comprising:
        a pivot bar, the pivot bar being configured to be pivotably coupled to an underside of a truck;
        a pair of back arms coupled to the pivot bar, the pair of back arms extending vertically down from the pivot bar;
        a pair of roller tracks coupled to the pair of back arms, the pair of roller tracks rollingly receiving the plurality of rollers;
        a pair of hydraulic cylinders coupled to the pair of roller tracks, a cylinder top end of each cylinder being configured to be coupled to the underside of the truck, each cylinder having a lock maintaining a compressed position securing the pair of roller tracks horizontally and alternatively releasing each cylinder to an extended position and angling the pair of roller tracks; and
        a release button, the release button being in operational communication with the lock of each cylinder, the release button being configured to be coupled within a cab of the truck.

2. The rolling spare tire storage apparatus of claim 1 further comprising a handle coupled to a lead edge of the rack body.

3. The rolling spare tire storage apparatus of claim 1 further comprising each of the arms being L-shaped and having a cylindrical shoulder coupled to the rack top side.

4. The rolling spare tire storage apparatus of claim 1 further comprising each of the brackets having a sleeve slidably coupled around the arm, the sleeve having a locking bolt to adjustably secure the sleeve to the arm, a bracket body being coupled to the sleeve, the bracket body being configured to selectively engage the tire.

5. The rolling spare tire storage apparatus of claim 4 further comprising the bracket body having an L-shaped profile and comprising a side wall and a top wall.

6. The rolling spare tire storage apparatus of claim 5 further comprising the top wall tapering towards an inner edge.

7. The rolling spare tire storage apparatus of claim 6 further comprising the inner edge being rounded.

8. A rolling spare tire storage apparatus comprising:
    a tire rack, the tire rack comprising:
        a rack body, the rack body having a rack top side, a rack bottom side, and a rack perimeter;
        a handle coupled to a lead edge of the rack body;
        a plurality of rollers coupled to the rack, the plurality of rollers being coupled to a left edge and a right edge of the rack perimeter;
        a plurality of arms coupled to the rack body, each arm being L-shaped and having a cylindrical shoulder coupled to the rack top side, the arm being selectively rotatable within the shoulder; and
        a plurality of brackets coupled to the plurality of arms, each of the brackets having a sleeve slidably coupled around the arm, the sleeve having a locking bolt to adjustably secure the sleeve to the arm, a bracket body being coupled to the sleeve, the bracket body having an L-shaped profile and comprising a side wall and a top wall, the top wall tapering towards a rounded inner edge, the bracket body being configured to selectively engage a tire and secure the tire to the rack body; and
    a pivot mount, the pivot mount comprising:
        a pivot bar, the pivot bar being configured to be pivotably coupled to an underside of a truck;
        a pair of back arms coupled to the pivot bar, the pair of back arms extending vertically down from the pivot bar;
        a pair of roller tracks coupled to the pair of back arms, the pair of roller tracks rollingly receiving the plurality of rollers;
        a pair of hydraulic cylinders coupled to the pair of roller tracks, a cylinder top end of each cylinder being configured to be coupled to the underside of the truck, each cylinder having a lock maintaining a compressed position securing the pair of roller tracks horizontally and alternatively releasing each cylinder to an extended position and angling the pair of roller tracks; and a release button, the release button being in operational communication with the lock of each cylinder, the release button being configured to be coupled within a cab of the truck.

\* \* \* \* \*